United States Patent [19]
Eastridge et al.

[11] Patent Number: 5,379,412
[45] Date of Patent: Jan. 3, 1995

[54] METHOD AND SYSTEM FOR DYNAMIC ALLOCATION OF BUFFER STORAGE SPACE DURING BACKUP COPYING

[75] Inventors: Lawrence E. Eastridge; James M. Ratliff, both of Tucson, Ariz.

[73] Assignee: International Business Machines Corporation, Armonk, N.Y.

[21] Appl. No.: 871,373

[22] Filed: Apr. 20, 1992

[51] Int. Cl.[6] .............................................. G06F 11/00
[52] U.S. Cl. ...................... 395/575; 395/250; 395/425; 364/DIG. 1; 364/268; 364/268.2; 364/285.1; 364/239
[58] Field of Search ................ 395/575, 425, 250, 650

[56] References Cited
U.S. PATENT DOCUMENTS

| | | | |
|---|---|---|---|
| 4,351,023 | 9/1982 | Richer | 364/187 |
| 4,507,751 | 3/1985 | Gawlick et al. | 364/DIG. 1 |
| 4,751,702 | 6/1988 | Beier et al. | 371/9.1 |
| 4,941,087 | 7/1990 | Kap | 364/DIG. 1 |

Primary Examiner—Eddie P. Chan
Attorney, Agent, or Firm—Manny Schecter; Andrew J. Dillon

[57] ABSTRACT

A method and system for the dynamic allocation of a buffer storage space during backup copying. Backup copying of designated datasets representing point in time consistency may be performed in a data processing system on one or more storage subsystems concurrent with data processing system application execution by suspending execution only long enough to form a logical to physical address concordance and thereafter physically backing up the datasets on the storage subsystems on a scheduled or opportunistic basis. A particular area of an established buffer storage space is dynamically allocated for each designated dataset to be backed up. The designated datasets are then stored in the particular areas and indexed. After all designated datasets to be backed up are copied to an alternate storage subsystem location, the buffer storage space is released.

8 Claims, 6 Drawing Sheets

METHOD AND SYSTEM FOR DYNAMIC ALLOCATION OF BUFFER STORAGE SPACE DURING BACKUP COPYING

CROSS-REFERENCE TO RELATED APPLICATION

The present application is related to U.S. Pat. application Ser. No. 07/781,044, entitled Method and Means for Time Zero Backup Copying of Data, filed Oct. 18, 1991, and assigned to the assignee herein named. The contents of the cross-reference United States Patent Application are hereby incorporated herein by reference thereto.

BACKGROUND OF THE INVENTION
1. Technical Field:

The present invention relates in general to the field of data processing systems and in particular to methods and systems for maintaining continued availability to accessing data processing systems during backup copying of designated datasets stored within one or more storage subsystems. Still more particularly, the present invention relates to methods and systems for dynamic allocation of a buffer storage space within a data processing system during backup copying of designated datasets and indexing each designated dataset once it has been copied.

2. Description of the Related Art:

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, the higher the backup frequency, the more accurately the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multiprocessing, multiprogramming facility, relative to other types of processing.

Applications executed within a data processing system are typically executed in either a batch (streamed) or interactive (transactional) mode. In a batch mode, usually one application at a time executes without interruption. Interactive mode is characterized by interrupt driven multiplicity of applications or transactions.

When a data processing system is in the process of backing up data in either a streamed or batch mode system, each process, task or application within the data processing system is affected. That is, the processes supporting streamed or batch mode operations are suspended for the duration of the copying. Those skilled in the art will recognize that this event is typically referred to as a "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency which results in a consistency described as "fuzzy." That is, the backup copy is not a precise "snapshot" of the state of a dataset/data base at a single point in time. Rather, a log comprises an event file requiring further processing against the database.

A co-pending U. S. Pat. application Ser. No. 07/385,647, filed Jul. 25, 1989, entitled A Computer Based Method For Dataset Copying Using an Incremental Backup Policy, illustrates backup in a batch mode system utilizing a modified incremental policy. A modified incremental policy copies only new data or data updates since the last backup. It should be noted that execution of applications within the data processing system are suspended during copying in this system.

As described above, to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault, in order to exhibit a point in time consistency.

U. S. Pat. No. 4,507,751, Gawlick et al., entitled Method and Apparatus for Logging Journal Data Using a Write Ahead Dataset, issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U. S. Pat. application Ser. No. 07/524,206, filed May 16, 1990, entitled Method and Apparatus for Executing Critical Disk Access Commands, teaches the performance of media maintenance on selected portions of a tracked cyclic operable magnetic media concurrent with active access to other portions of the storage media. The method described therein requires the phased movement of customer data between a target track to an alternate track, diversion of all concurrent access requests to the alternate track or tracks and the completion of maintenance and copy back from the alternate to the target track.

During backup copying, the backup program acquires a buffer storage space large enough to generally hold some portion, such as a record, block track or cylinder, of a dataset. The data is read in these increments by the backup program and then written to the alternate storage system before more data is read. The backup program's performance is "paced" based on the buffer sizes used. In known data processing systems, the size of the buffer storage space acquired has been determined based on the requirements of the backup program and not on optimizing the backup copying process for the entire system including the hardware and input/output channels.

Therefore, it should be obvious that a need exists for a method and system whereby the size of a buffer storage space is determined based on considerations for the optimization of the backup copying process for the entire system including the hardware and input/output channels.

SUMMARY OF THE INVENTION

It is therefore one object of the present invention to provide an improved method and system for maintaining continued availability to accessing data processing systems during the backup copying of designated datasets stored within one or more storage subsystems.

It is another object of the present invention to provide an improved method and system for the dynamic allocation of a buffer storage space within a data processing system during the backup copying of designated datasets.

It is yet another object of the present invention to provide an improved method and system for the dynamic allocation of a particular area of a buffer storage space for each designated dataset to be copied and indexing the designated datasets once each designated dataset has been copied.

The foregoing objects are achieved as is now described. A method and system are disclosed for the dynamic allocation of a buffer storage space during backup copying. Backup copying of designated datasets representing point in time consistency may be performed in a data processing system on one or more storage subsystems concurrent with data processing system application execution by suspending execution only long enough to form a logical to physical address concordance and thereafter physically backing up the datasets on the storage subsystems on a scheduled or opportunistic basis. A particular area of an established buffer storage space is dynamically allocated for each designated dataset to be backed up. The designated datasets are then stored in the particular areas and indexed. After all designated datasets to be backed up are copied to an alternate storage subsystem location, the buffer storage space is released.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
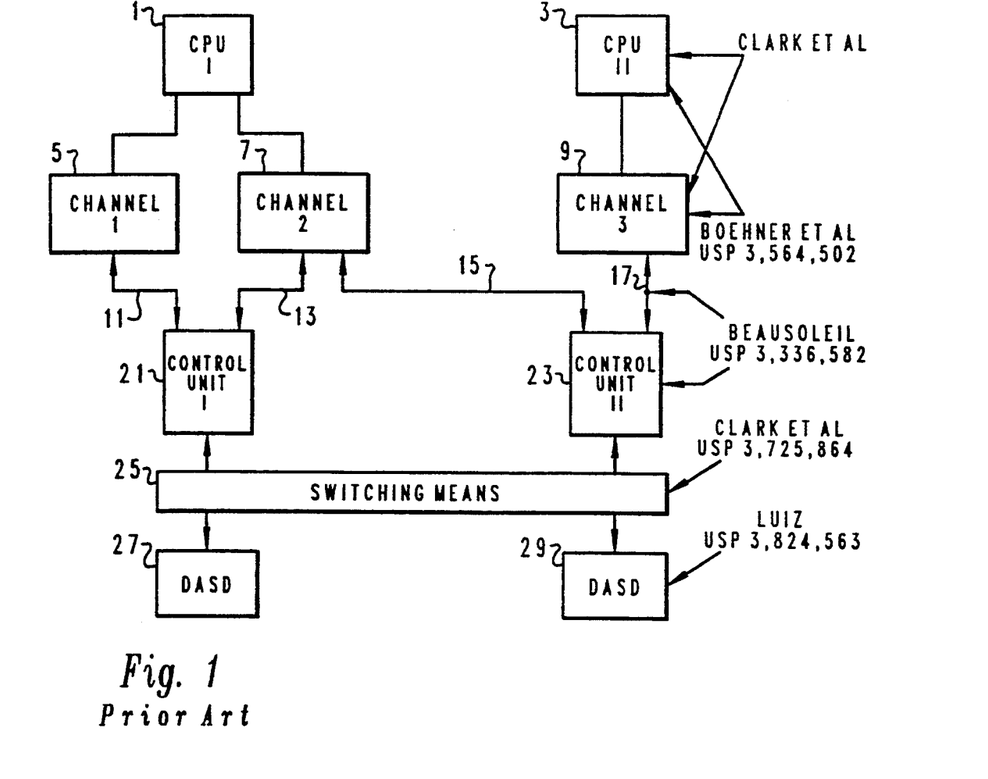
FIG. 1 depicts a typical multiprocessing multiprogramming environment according to the prior art where executing processors and applications randomly or sequentially access data from external storage.

With reference now to the figures and in particular with reference to FIG. 1, there is depicted a multiprocessing, multiprogramming data processing system according to the prior art. Such systems typically include a plurality of processors 1 and 3 which access external storage units 21, 23, 25, 27, and 29 over redundant channel demand/response interfaces 5, 7 and 9.

The illustrated embodiment in FIG. 1 may be provided in which each processor within the data processing system is implemented utilizing an IBM/360 or 370 architected processor type having, as an example, an IBM MVS operating system. An IBM/360 architected processor is fully described in Amdahl et al., U.S. Pat. No. 3,400,371, entitled Data Processing System, issued on Sep. 3, 1968. A configuration in which multiple processors share access to external storage units is set forth in Luiz et al., U.S. Pat. No. 4,207,609, entitled Path Independent Device Reservation and Reconnection in a Multi-CPU and Shared Device Access System, issued Jan. 10, 1980.

The MVS operating system is also described in IBM Publication GC28-1150, entitled MVS/Extended Architecture System Programming Library: System Macros and Facilities, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may establish a path to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Figure 2:
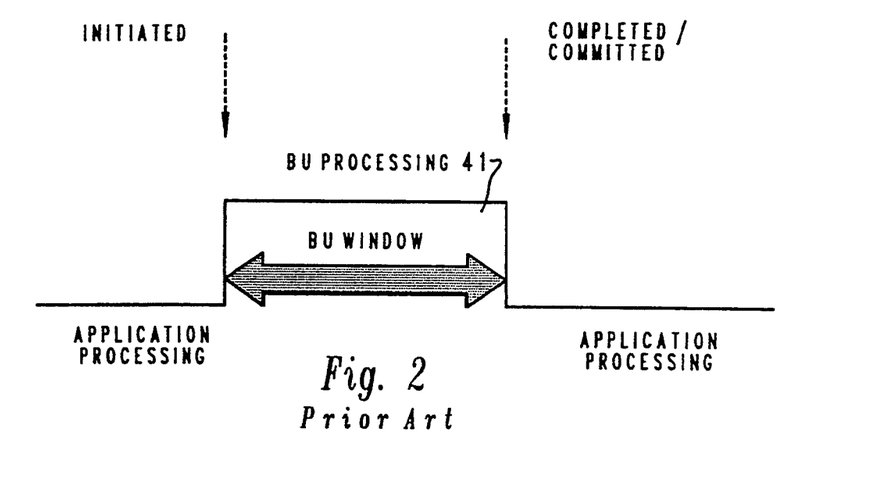
FIG. 2 depicts a time line of a backup window during batch processing according to the prior art.

Referring now to FIG. 2, there is depicted a time line illustrating the backup window in a batch or streaming process in the prior art. As illustrated at FIG. 2, multiple backup operations have occurred, as indicated at backup window 41. Application processing is typically suspended or shut down just prior to each backup window and this suspension will persist until the backup process has been completed. Termination of the backup window signifies completion of the backup process and commitment. By "completion" what is meant is that all data that was to have been copied was in fact read from the source. By "commitment" what is meant is that all data to be copied was in fact written to an alternate storage location.

Figure 3:
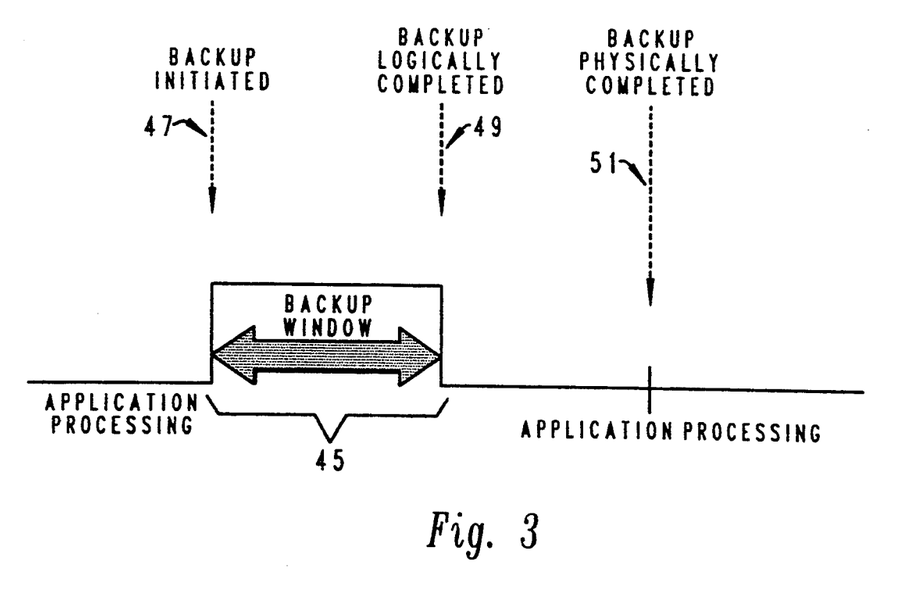
FIG. 3 depicts a time line of a backup window during batch processing in accordance with the method and system of the present invention.

With reference now to FIG. 3, a backup window for a time zero backup copy system is depicted. As described in detail within the co-pending cross-referenced patent application, backup window 45 still requires the suspension or termination of application processing; however, the suspension or termination occurs only for a very short period of time. As described in the cross-referenced application, the time zero backup method begins as depicted at 47, effectively freezing data within the datasets to be backed up at that point in time. Thereafter, a bit map is created identifying each track within the datasets to be backed up and after creation of that bit map, the copy is said to be "logically complete" as illustrated at 49. The committed state, or "physically complete" state depicted at 51 will not occur until some time later. However, at the "logically complete" point in time, the data is completely usable by applications within the data processing system. The time during which application processing is suspended in such a system is generally in the low sub-second range; however, those skilled in the art will appreciate that the amount of time required to create a bit map to the data to be copied will depend upon the amount of data within the datasets.

Of course, those skilled in the art will appreciate that if the time zero backup process terminates abnormally between the point of logical completion and the point of physical completion, the backup copy is no longer useful and the process must be restarted. In this respect, the time zero backup process is vulnerable in a manner very similar to that of backup systems in the prior art. That is, all backup operations must be rerun if the process terminates abnormally prior to completion.

Figure 4:
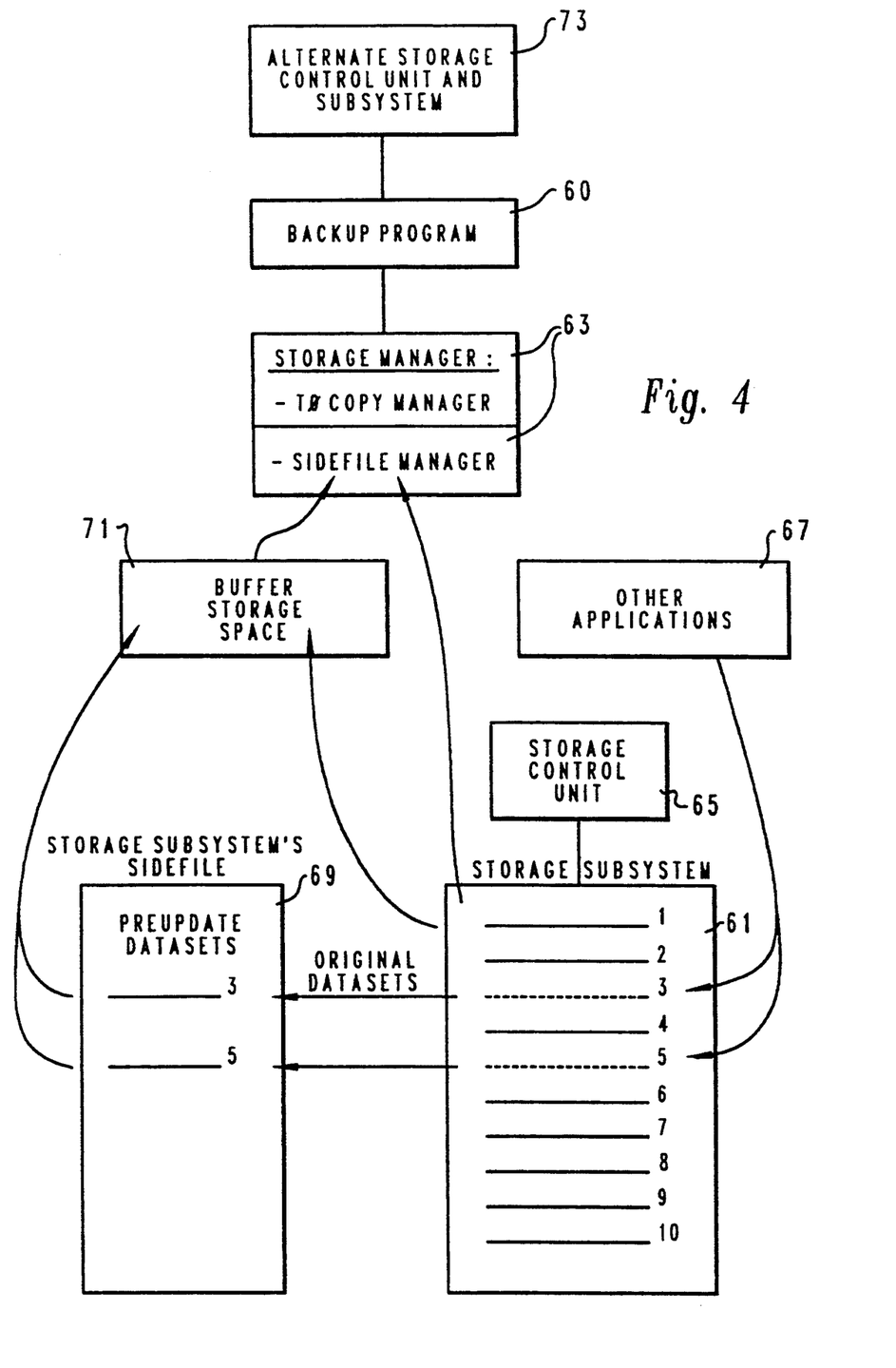
FIG. 4 depicts a conceptual flow of a backup copy process in accordance with the method and system of the present invention.

Now referring to FIG. 4, there is depicted a conceptual flow of a backup copy process in accordance with the method and system of the present invention. As illustrated, an incremental time zero backup copy of data within a tracked cyclic storage device 61 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key-data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of explanation of this invention, backup processing will be described as managed both at the resource manager level within a data processing system and at the storage control unit level.

As will be described below, after the backup program 60 issues a request to storage manager 63 to copy designated datasets, an initialization period occurs during which datasets are sorted, one or more bit maps are created and logical completion of the bit map is signaled to the invoking process at the processor. The listed or identified datasets are then sorted according to access path elements down to DASD track granularity. Next, bit maps are constructed which correlate the dataset and the access path insofar as any one of them is included or excluded from a given copy session. Lastly, storage manager 63, which includes T0 copy manager and sidefile manager, signals logical completion, indicating that updates will be processed against the dataset only after a short delay until such time as physical completion occurs.

Following initialization, storage manager 63 begins reading the tracks of data which have been requested. While a copy session is active, each storage control unit monitors all updates to the dataset. If an update is received from another application 67, storage control unit 65 will execute a predetermined algorithm to process that update, as described below.

In a time zero backup copy system a determination is first made as to whether or not the update attempted by application 67 is for a volume which is not within the current copy session. If the volume is not within the current copy session, the update completes normally. Alternately, if the update is for a volume which is part of the copy session, the primary session bit map is checked to see if that track is protected. If the corresponding bit within the bit map is off, indicating the track is not currently within a copy session, the update completes normally. However, if the track is protected (the corresponding bit within the bit map is on) the track in question is part of the copy session and has not as yet been read by the storage manager 63.

Thus, as illustrated in FIG. 4, an update initiated by application 67 may be processed through storage control unit 65 to update data at tracks 3 and 5 within tracked cyclic storage unit 61. Prior to permitting the update to occur, tracks 3 and 5 are written as sidefiles to a memory within storage control unit 65, as depicted by storage subsystem's sidefile 69, and thereafter, the update is permitted to complete. The primary bit map is then altered to indicate that the copies of tracks 3 and 5, as those tracks existed at the time a backup copy was requested, are no longer within tracked cyclic storage device 61 but now reside within a memory within storage control unit 65.

The storage subsystem then holds the update, makes a copy of the dataset from storage subsystem 61 into storage subsystem's sidefile 69, and allows the update to continue. Storage subsystem 61 now includes the update to the selected dataset while storage subsystem's sidefile 69 includes the original.

Storage manager 63 determines the number of all designated datasets requested for backup copying by backup program 60. Storage manager 63 then dynamically allocates the buffer storage space 71 into areas to be able to accommodate the designated datasets. Original datasets not affected by the updates are copied into buffer storage space 71 from storage subsystem 61. The original copies of datasets affected by updates are copied into buffer storage space 71 from storage subsystem's sidefile 69. Once in buffer storage space 71, storage manager 63 indexes the dataset for retrieval by backup program 60. Backup program 60 may then copy all designated datasets from buffer storage space 71 to alternate storage systems 73. As will be appreciated by those skilled in the art, storage manager 63 may copy data directly from the storage subsystem 61, thus interfering with all other application processing, such that other application processing can appear to be suspended during this copy process.

As will be appreciated by those skilled in the art, buffer storage space 71 may also be utilized for the buffering of any operating system input/output (I/O) operations, thus optimizing the storage control unit to input/output channel to host data processing system data transfer for all host data processing system input- /outputs. This buffering may optimize the data flow into and out of the host data processing system, independent of the calling application. The buffer storage space 71 size allows this optimization to occur while permitting data to be made available utilizing smaller increments of buffer storage space 71.

Figure 5A:
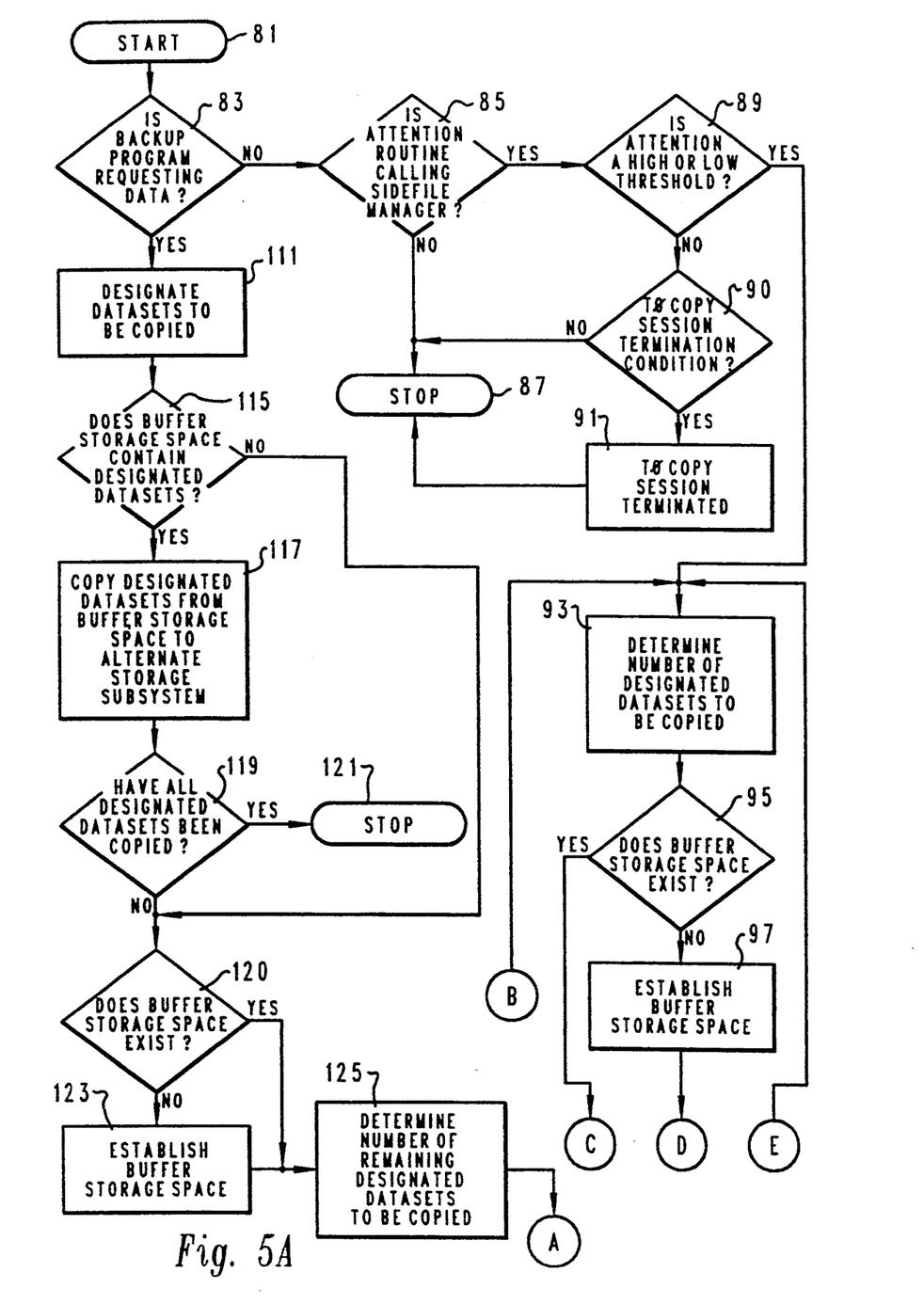
FIGS. 5A and 5B combined depict a high level flow chart illustrating the establishment of a buffer storage space in accordance with the method and system of the present invention.
Figure 5B:
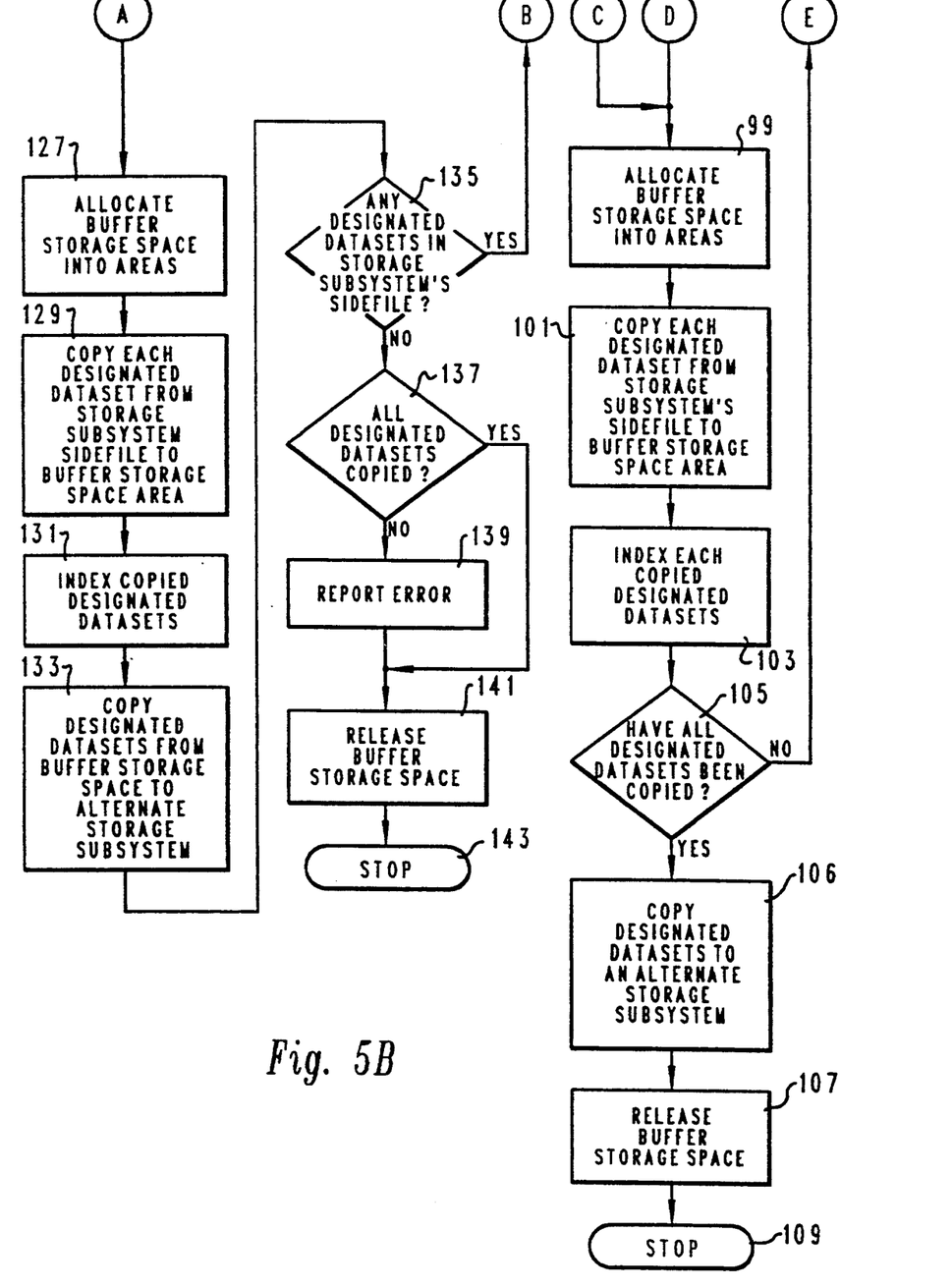

With reference now to FIGS. 5A and 5B, there is depicted a high level flow chart illustrating the establishment of a buffer storage space in accordance with the method and system of the present invention. The process begins at block 81 and thereafter passes to block 83 which depicts a determination of whether or not a backup program 60 has requested datasets to be backed up. If a determination is made that a backup program 60 has not requested datasets to be backed up, the process passes to block 85 which illustrates a determination of whether or not the attention routine is calling the sidefile manager portion of storage manager 63.

An attention is raised when storage subsystem's sidefile 69 has accumulated a predetermined number of pre-update copies of datasets. If a determination is made that the attention routine is not calling the sidefile manager, the process thereafter passes to block 87 which depicts the termination of the process.

Referring again to block 85, if a determination is made that the attention routine is calling the sidefile manager, the process passes to block 89 which illustrates a determination of whether or not an attention level is a high or low threshold level. If a determination is made that the attention level is not either a high or low threshold level, the process passes to block 90 which depicts a determination of whether or not the attention interrupt signaled by the attention level is a T0 copy session termination condition. If a determination is made that the attention interrupt is a T0 copy session termination condition, the process passes to block 91 which illustrates the T0 copy session being terminated. Thereafter the process passes to block 87 which depicts the termination of the process. If a determination is made that the attention interrupt is not a T0 copy session termination condition, the process again passes to block 87 which illustrates the termination of the process.

Referring again to block 89, if a determination is made that the attention level is either a high or low threshold level, the process passes to block 93 which depicts a determination of the number of designated datasets to be copied. Next, the process passes to block 95 which illustrates a determination of whether or not a buffer storage space exists. If a determination is made that a buffer storage space does not exist, the process passes to block 97 which depicts the establishment of a buffer storage space.

Thereafter the process passes to block 99 which illustrates the dynamic allocation of the buffer storage space into areas. Referring again to block 95, if a determination is made that a buffer storage space does exist, the process again passes to block 99. The process next passes to block 101 which depicts the copying of each designated dataset contained within storage subsystem's sidefile 69 to an area within buffer storage space 71. Next, the process passes to block 103 which illustrates the indexing of each copied designated dataset.

The process then passes to block 105 which depicts a determination of whether or not all designated datasets have been copied from the storage subsystem's sidefile. If a determination is made that not all designated datasets have been copied, the process passes back to block 93. Referring again to block 105, if a determination is made that all designated datasets have been copied, the process passes to block 106 which illustrates the copying of designated datasets to an alternate storage subsystem. Next, block 107 depicts the releasing of the established buffer storage subsystem. The process then terminates as illustrated at block 109.

Referring again to block 83, if a determination is made that a backup program is requesting datasets to be backed up, the process passes to block 111 which depicts the designation of datasets to be copied. The process next passes to block 115 which depicts a determination of whether or not a buffer storage space contains designated datasets. If a determination is made that a buffer storage space does contain designated datasets, the process passes to 117 which illustrates the copying of the designated datasets from the buffer storage space to an alternate storage subsystem.

Thereafter, the process passes to block 119 which depicts a determination of whether or not all designated datasets have been copied. If a determination is made that all designated datasets have been copied to an alternate storage subsystem. The process then terminated as illustrated at block 121. Referring again to block 119, if a determination is made that not all designated datasets have been copied, the process passes to block 120 which illustrates a determination of whether or not a buffer storage space exists. If a determination is made that a buffer storage space does not exist the process passes to block 123 which illustrates the establishment of a buffer storage space. Thereafter, the process passes to block 125 which depicts the determination of a number of remaining designated datasets to be copied.

Referring back to block 115, if a determination is made that the buffer storage space does not contain designated datasets, the process again passes to block 120 which again illustrates a determination of whether or not a buffer storage space exists. Referring again to block 120, if a determination is made that a buffer storage space does exist, the process again passes to block 125. Thereafter, the process passes to block 127 which depicts the allocation of the buffer storage space into areas.

The process then passes to block 129 which depicts the copying of each designated datasets from the storage system's sidefile to an area within the buffer storage space. Thereafter, the process passes to block 131 which illustrates the indexing of each copied designated dataset. The process then passes to block 133 which depicts the copying of the designated datasets contained within each area of the buffer storage space to an alternate storage subsystem. The process next passes to block 135 which illustrates a determination of whether or not any designated datasets are stored within the storage subsystem's sidefile. If a determination is made that designated datasets are stored within the storage subsystem's sidefile, the process passes back to block 93.

Referring again to block 135, if a determination is made that designated datasets are not stored within the storage subsystem's sidefile, the process then passes to block 137 which illustrates a determination of whether or not all designated datasets have been copied. If a determination is made that not all designated datasets have been copied, the process passes to block 139 which depicts the reporting of an error for each designated dataset that was not copied. The process next passes to block 141. Referring back to block 137, if a determination is made that all designated datasets have been copied, the process passes to block 141 which illustrates the releasing of the buffer storage space. The process then terminates as depicted at block 143.

Figure 6:
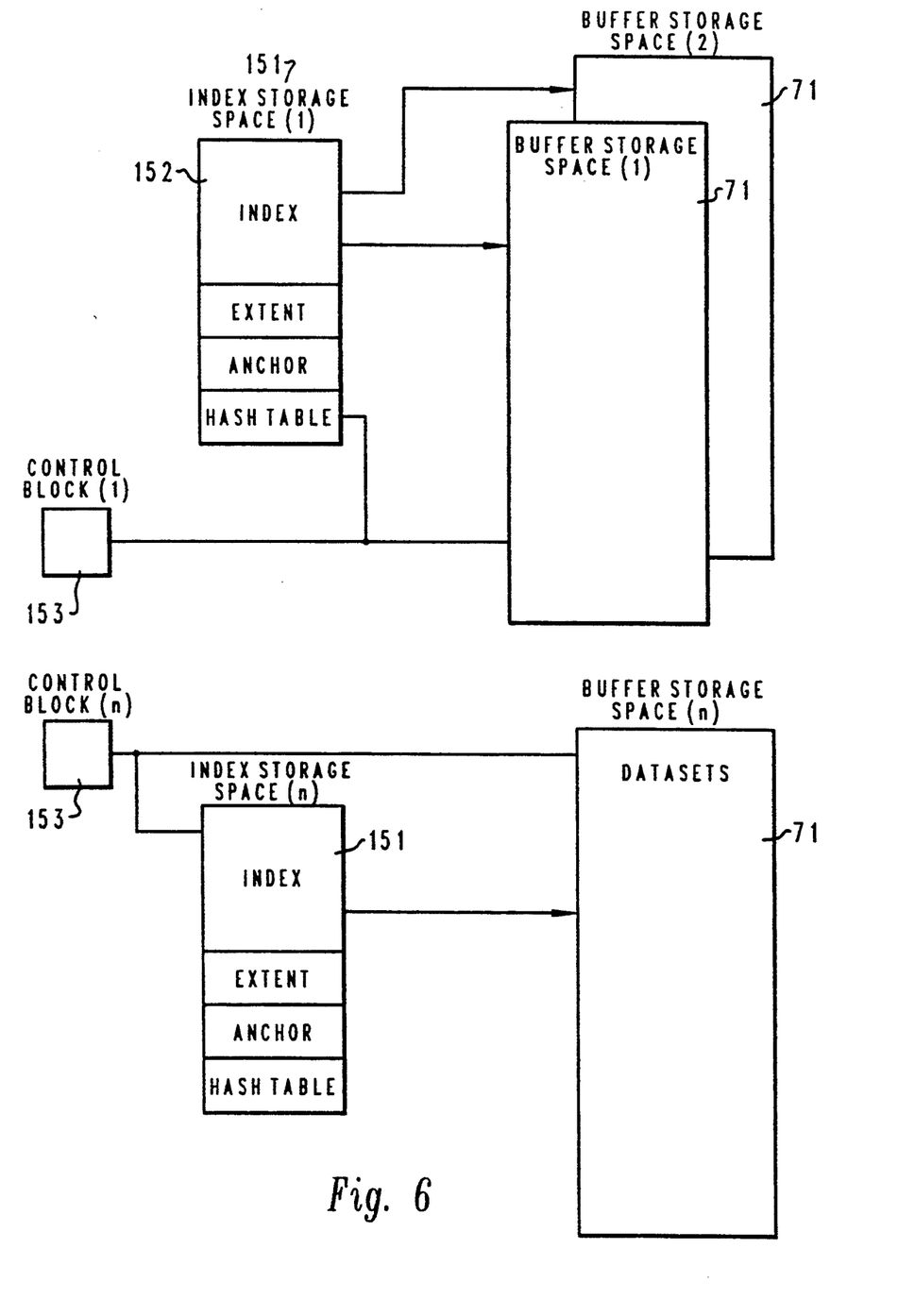
FIG. 6 depicts a pictorial representation of a plurality of buffer storage spaces and their associated index storage spaces in accordance with the method and system of the present invention.

Now referring to FIG. 6, there is depicted a pictorial representation of a plurality of buffer storage spaces and their associated index storage spaces in accordance with the method and system of the present invention. An index storage space 151 is utilized to index a dynamic number of buffer storage spaces 71. Datasets from either storage subsystem 61 or storage subsystem's sidefile 69 are copied to buffer storage space 71 in a random order but must be identified in order to be retrieved by backup program 60.

Each index storage space 151 includes an index 152, extent, anchor, and hash table which are utilized to index the datasets included within data storage space 71. Control block 153 manages the link between index storage space 151 and its associated buffer storage space 71 by including information such as the maximum size of buffer storage space 71, current size of buffer storage space 71 and index storage space 151, starting address of buffer storage space 71, and pointers necessary to locate index storage space 151 and buffer storage space 71. Index area 152 includes information about its associated buffer storage space 71 such as the subsystem ID, volume, T0 copy physical ID and the track location. In this manner, datasets for multiple backup programs may be read asynchronously into buffer storage space 71 and then indexed such that each backup program can synchronously read the designated datasets to be backed up. These designated datasets may then be copied to an alternate storage subsystem after buffer storage space 71 is released.

Therefore, a buffer storage space may be established and altered dynamically to accommodate datasets designated by a backup program for backup copying. The buffer storage space may be allocated into areas each corresponding to the number of datasets to be copied. After these datasets have been copied into the buffer storage space in a random order, the datasets are indexed for retrieval by the backup program.

While the invention has been particularly shown and described with reference to a preferred embodiment, it will be understood by those skilled in the art that various changes in form and detail may be made therein without departing from the spirit and scope of the invention.

We claim:

1. A method in a data processing system for backup copying of a plurality of designated datasets stored within one or more storage subsystems coupled to said data processing system during application execution within said data processing system, said method comprising the data processing system implemented steps of:
   suspending said application execution within said data processing system, forming a dataset logical-to-physical storage system address concordance for said plurality of designated datasets and resuming said application execution thereafter;
   establishing a buffer storage space within said data processing system, wherein said buffer storage space includes a plurality of areas;
   determining a number of all of said plurality of designated datasets to be utilized for backup copying and dynamically allocating a particular one of said plurality of areas of said buffer storage space for each of said number of all of said plurality of designated datasets;
   physically backing up said plurality of designated datasets within said one or more storage subsystems on a scheduled or opportunistic basis utilizing said dataset logical-to-physical storage system address concordance by copying each of said plurality of designated datasets from said one or more storage subsystems to a particular one of said plurality of areas and indexing each of said copied plurality of designated datasets;
   processing at said one or more storage subsystems any updates initiated by said application to un-copied datasets among said plurality of designated datasets by temporary buffering said updates within said storage subsystem, writing as sidefiles said plurality of designated datasets or portions thereof affected by said updates within said storage subsystem, and writing said buffered updates to said one or more storage subsystems;
   copying each of said plurality of designated datasets affected by said updates from said sidefiles to a particular one of said plurality of areas of said buffer storage space and indexing each of said copied plurality of designated datasets affected by said updates;
   copying all of said plurality of designated datasets from all of said plurality of areas to an alternate storage subsystem location; and
   releasing said buffer storage space in response to all of said plurality of designated datasets being copied from all of said plurality of areas to said alternate storage subsystem location.

2. The method in a data processing system for backup copying of a plurality of designated datasets stored within one or more storage subsystems coupled to said data processing system during application execution within said data processing system according to claim 1, further comprising the step of deleting all of said plurality of designated datasets from all of said plurality of areas in response to all of said plurality of designated datasets being copied from all of said plurality of areas to said alternate storage subsystem location.

3. The method in a data processing system for backup copying of a plurality of designated datasets stored within one or more storage subsystems coupled to said data processing system during application execution within said data processing system according to claim 1, wherein said buffer storage space is established within an extended memory within said data processing system.

4. The method in a data processing system for backup copying of a plurality of designated datasets stored within one or more storage subsystems coupled to said data processing system during application execution within said data processing system according to claim 1, wherein each of said plurality of areas is sufficient to store one dataset.

5. A data processing system for backup copying of a plurality of designated datasets stored within one or more storage subsystems coupled to said data processing system during application execution within said data processing system, comprising:
   means for suspending said application execution within said data processing system, forming a dataset logical-to-physical storage system address concordance for said plurality of designated datasets and resuming said application execution thereafter;

means for establishing a buffer storage space within said data processing system, wherein said buffer storage space includes a plurality of areas;

means for determining a number of all of said plurality of designated datasets to be utilized for backup copying and dynamically allocating a particular one of said plurality of areas of said buffer storage space for each of said number of all of said plurality of designated datasets;

means for physically backing up said plurality of designated datasets within said one or more storage subsystems on a scheduled or opportunistic basis utilizing said dataset logical-to-physical storage system address concordance by copying each of said plurality of designated datasets from said one or more storage subsystems to a particular one of said plurality of areas and indexing each of said copied plurality of designated datasets;

means for processing at said one or more storage subsystems any updates initiated by said application to uncopied datasets among said plurality of designated datasets by temporary buffering said updates within said storage subsystem, writing as sidefiles said plurality of designated datasets or portions thereof affected by said updates within said storage subsystem, and writing said buffered updates to said one or more storage subsystems;

means for copying each of said plurality of designated datasets affected by said updates from said sidefiles to a particular one of said plurality of areas of said buffer storage space and indexing each of said copied plurality of designated datasets affected by said updates;

means for copying all of said plurality of designated datasets from all of said plurality of areas to an alternate storage subsystem location; and means for releasing said buffer storage space in response to all of said plurality of designated datasets being copied from all of said plurality of areas to said alternate storage subsystem location.

6. The data processing system for backup copying of a plurality of designated datasets stored within one or more storage subsystems coupled to said data processing system during application execution within said data processing system according to claim 5, further comprising means for deleting all of said plurality of designated datasets from all of said plurality of areas in response to all of said plurality of designated datasets being copied from all of said plurality of areas to said alternate storage subsystem location.

7. The data processing system for backup copying of a plurality of designated datasets stored within one or more storage subsystems coupled to said data processing system during application execution within said data processing system according to claim 5, wherein said buffer storage space is established within an extended memory within said data processing system.

8. The data processing system for backup copying of a plurality of designated datasets stored within one or more storage subsystems coupled to said data processing system during application execution within said data processing system according to claim 5, wherein each of said plurality of areas is sufficient to store one dataset.

* * * * *